(12) United States Patent
Nantz et al.

(10) Patent No.: US 7,397,344 B2
(45) Date of Patent: Jul. 8, 2008

(54) DUAL RANGE VEHICLE REMOTE

(75) Inventors: John Nantz, Brighton, MI (US);
Matthew Honkanen, Royal Oak, MI (US); Bruce D. Conner, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 256 days.

(21) Appl. No.: 11/030,658

(22) Filed: Jan. 6, 2005

(65) Prior Publication Data
US 2006/0145811 A1   Jul. 6, 2006

(51) Int. Cl.
*H04Q 1/00* (2006.01)
*G08C 19/00* (2006.01)

(52) U.S. Cl. ..................... 340/5.72; 340/5.64
(58) Field of Classification Search ............... 340/5.72, 340/5.7, 825.49, 5.64
See application file for complete search history.

(56) References Cited

U.S. PATENT DOCUMENTS

| | | | |
|---|---|---|---|
| 4,054,950 A * | 10/1977 | Boone ..................... 375/316 |
| 6,346,878 B1 | 2/2002 | Pohlman et al. | |
| 6,359,348 B1 | 3/2002 | King | |
| 6,396,412 B1 | 5/2002 | Banas | |
| 6,700,475 B1 | 3/2004 | Geber et al. | |
| 2001/0038328 A1 | 11/2001 | King et al. | |
| 2003/0189481 A1* | 10/2003 | Hamid ..................... 340/5.53 |
| 2003/0216124 A1 | 11/2003 | Emmerling et al. | |
| 2004/0099430 A1* | 5/2004 | Scudder ................... 174/52.3 |
| 2005/0143058 A1* | 6/2005 | Chang et al. ............. 455/418 |

FOREIGN PATENT DOCUMENTS

| | | |
|---|---|---|
| DE | 19605836 | 1/1997 |
| DE | 19736302 | 4/1998 |
| DE | 19836957 | 9/1999 |
| DE | 19864116 | 8/2001 |
| DE | 69728617 | 4/2005 |
| EP | 1 466 789 A1 | 10/2004 |
| EP | 1466789 | 10/2004 |

OTHER PUBLICATIONS

Marshall Brian, How Remote Entry Works, 20030115, How Stuff Works, pp. 1-3.*

* cited by examiner

*Primary Examiner*—Brian Zimmerman
*Assistant Examiner*—Yong Hang Jiang
(74) *Attorney, Agent, or Firm*—MacMillan, Sobanski & Todd, LLC

(57) ABSTRACT

A method and system are disclosed for operating a controller of and a RKE system to provide for short distance functions that are actuatable from a key fob at a shorter distance from the vehicle than other long distance functions. This may include receiving a desired type of radio frequency signal; actuating a high gain mode of a receiver of the controller; detecting a message from an acceptable remote keyless entry transmitter; decoding a function code portion of the message; changing the receiver from the high gain mode to a lower gain mode if the function code is not a long distance function; decoding a remaining portion of the message; determining if the remaining portion of the message was decoded properly; and performing the requested function if the remaining portion of the message was decoded properly.

8 Claims, 3 Drawing Sheets

DUAL RANGE VEHICLE REMOTE

BACKGROUND OF INVENTION

The present invention relates to remote keyless entry types of systems employed with automotive vehicles.

Remote keyless entry systems are commonly used with automotive vehicles today. Such systems are including a wider range of functions that can be performed by the remote keyless entry system. For example, not only are the conventional lock, unlock, trunk release, and panic functions available, but also new functions such as remote engine start.

For certain functions, such as remote engine start, it is desirable to allow these functions to be performed while the operator is a greater distance from the vehicle than for some of the conventional functions. For example, one may wish to allow for the remote engine start, door lock, and panic alarm functions to be operable when the key fob is as far away from the vehicle as two hundred meters. To obtain this long rage functionality, the remote keyless entry system can be designed to operate at this greater distance.

Having the greater range of operation for the remote keyless entry system, however, may be undesirable for certain other remote keyless entry functions. One may wish to avoid inadvertently releasing the trunk if the trunk release button on the key fob is pressed when one is at this long range distance since he will not see or hear the trunk release. Moreover, one may not wish to inadvertently unlock the vehicle doors when at this longer range since one may be out of sight of the vehicle and thus not realize that the doors are unlocked. Accordingly, it may be undesirable for door unlock or trunk release functions to be operable from the same two hundred meter distance. Of course, the shorter range functions are still desirable for the remote keyless entry system, so operators may wish for these short-range functions to be operable only when the operator actuates the key fob at a more conventional range of, for example, about fifty meters or less.

Some have attempted to overcome this drawback by designing their remote keyless entry systems to try and detect the distance that the key fob is from the vehicle when the button is pressed, and then determine what function, if any, to perform based on this detected distance. This may be attempted by using received signal strength indicator (RSSI) circuitry. But due to environmental conditions, such as ambient radio frequency noise, this type of method can be very unrepeatable—that is, the range is not always consistently and accurately determined. Such inaccuracy may be undesirable for vehicle operators with these types of remote keyless entry systems. Thus, it is desirable to have a remote keyless entry system that allows for operation of both long-range and short-range functions, while overcoming the drawbacks of the prior art.

SUMMARY OF INVENTION

An embodiment of the present invention contemplates a method of operating a controller of a remote keyless entry system in a vehicle comprising the steps of: receiving a desired type of radio frequency signal; actuating a high gain mode of a receiver of the controller; detecting a message from an acceptable remote keyless entry transmitter; decoding a function code portion of the message; changing the receiver from the high gain mode to a lower gain mode if the function code is not a long distance function; decoding a remaining portion of the message; determining if the remaining portion of the message was decoded properly; and performing the requested function if the remaining portion of the message was decoded properly.

An embodiment of the present invention also contemplates a method of determining whether to perform a remotely requested vehicle function transmitted via an RF signal from a remote transmitter to a vehicle, the method comprising the steps of: actuating a button on the remote transmitter within a predetermined distance from the vehicle to cause the transmission of the RF signal, with the RF signal having a preamble portion and a message portion; receiving the RF signal with a RKE system in the vehicle; actuating a high gain mode of the RKE system; determining whether the remotely requested vehicle function in the message portion is a short distance function; changing the receiver to a lower gain mode if the remotely requested vehicle function is the short distance function; decoding a remaining portion of the message portion; and performing the remotely requested vehicle function if the remaining portion of the message portion is decoded properly.

An embodiment of the present invention further contemplates a dual range vehicle remote that includes a key fob and a remote keyless entry (RKE) system. The key fob includes a plurality of buttons, each adapted for indicating a desired remote function, and a transmitter capable of transmitting a signal having a message portion indicative of the desired function when one of the plurality of buttons is actuated. The RKE system may include a receiver capable of receiving the signal, and a controller for setting the RKE system in high gain mode, determining if the desired function in the message portion is a short distance function, changing the RKE system to a lower gain mode if the desired function is a short distance function, decoding a remaining portion of the message portion, and performing the desired function if the remaining portion of the message portion is decoded properly.

An advantage of an embodiment of the present invention is that, for certain remote keyless entry functions where it is desirable to operate from a long distance, these functions may operate at these longer distances, while other short distance functions are disabled at such long distances. Thus, inadvertent actuation of short distance functions from a long distance can be avoided.

A further advantage of an embodiment of the present invention is that the ability to disable the short distance functions when the key fob is at a long distance may be performed in a consistent and repeatable manner.

An additional advantage of an embodiment of the present invention is that no received signal strength indicator (RSSI) or other distance calculating technology is required in the operation of this invention.

DETAILED DESCRIPTION

Figure 1:
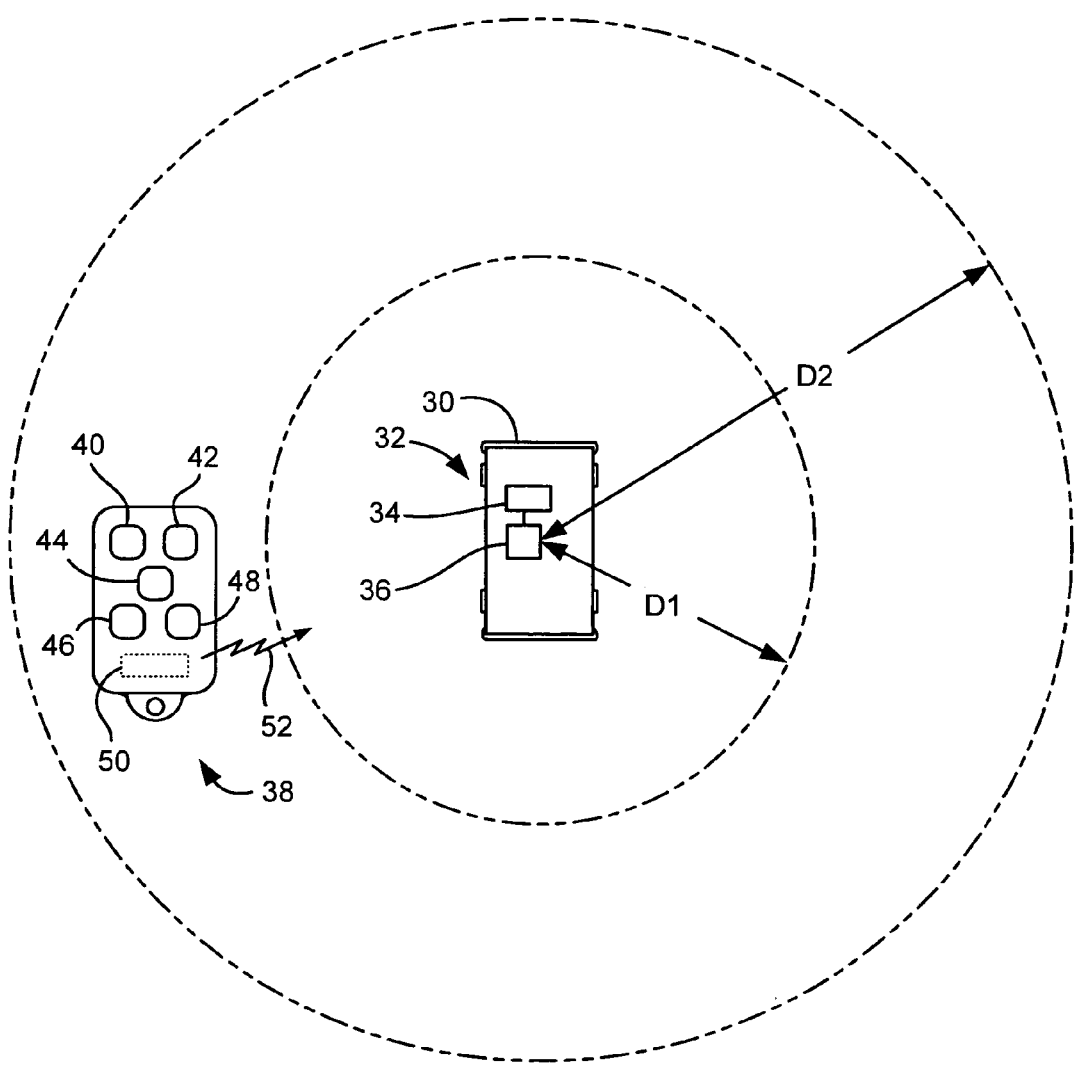
FIG. 1 is a schematic representation of the vehicle and remote keyless entry system, and the ranges at which the system operates, in accordance with an embodiment of the present invention.

FIG. 1 schematically shows a vehicle 30 having a remote keyless entry system, indicated generally at 32. The remote keyless entry (RKE) system 32 includes a controller 34 in communication with a receiver 36. The controller 34 may be in communication with systems that carry out the desired RKE functions, such as a door lock/unlock actuator (not shown), a vehicle horn and headlights (not shown), an engine ignition system (not shown), and/or a trunk release mechanism (not shown). These systems will not be described in any detail since they are known to those skilled in the art. Moreover, the controller 34 and receiver 36 may be integral or separate components, and may be comprised of various combinations of hardware and software, as is known to those skilled in the art.

A key fob 38 includes a set of buttons, such as, for example, lock 40, unlock 42, engine start 44, alarm 46, and trunk release 48. Of course, additional or different remote functions may be performed by the key fob 38, if so desired. For example, power door open and close functions may be included on the key fob. The key fob 38 also has a power source and other electronic circuitry, including a transmitter 50, which is capable of transmitting a radio frequency (RF) signal 52 in response to the actuation of one of the buttons on the key fob 38. The details of the transmitter 50 and other electronic circuitry (not shown) and power source (not shown) of the key fob 38 will not be discussed in detail herein since they are known to those skilled in the art.

FIG. 1 also provides an illustration of different ranges/distances at which the desired RKE functions may be operable. That is, when the key fob 38 is within a first range/distance D1, it is desirable that the RKE system 32 receives the RF signal 52 from the transmitter 50 and that all of the RKE functions are operable. Between the first range/distance D1 and a second range/distance D2, it is desirable that the RKE system 32 only perform long distance functions, while not enabling short distance functions. The actual ranges/distances D1, D2 employed by the system can be set as desired for a particular vehicle, but may be, for example, fifty meters for the shorter range/distance D1 and two hundred meters for the longer range/distance D2.

Long distance functions are those that are desired to operate up to the limits of about range/distance D2, while short distance functions are those that are desired to only operate up to the limits of about range/distance D1. For example, door lock, engine start, and alarm may be long distance functions while door unlock and trunk release may be short distance functions. As an alternative, a function may be applied as a long or short distance function depending upon whether it is being activated or deactivated. For example, if so desired, the alarm function may be treated by the RKE system 32 (in FIG. 1) as a long distance function if it is currently deactivated (i.e., one is pressing the alarm button 46 requesting to activate the alarm), but be treated as a short distance function if it is currently activated (i.e., one is pressing the alarm button 46 requesting deactivation of the alarm).

Figure 2:
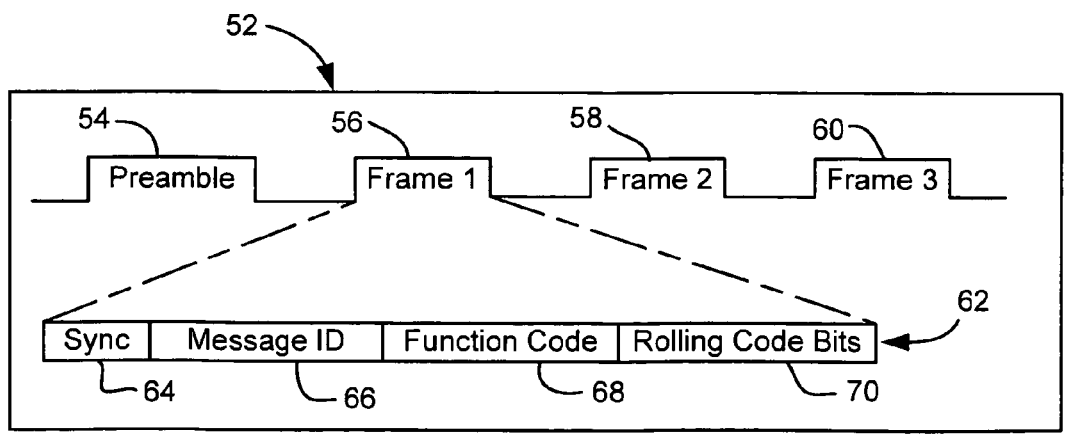
FIG. 2 is a block diagram representing an example of a radio frequency transmission from a key fob, in accordance with an embodiment of the present invention.

FIG. 2 illustrates a block diagram representing an example of the RF signal 52 from the key fob 38 (of FIG. 1). This RF signal 52 may employ a common format for transmitting an RF signal from the key fob 38. The RF signal 52 may include a preamble portion 54, followed by a first frame 56, a second frame 58 and a third frame 60. The preamble portion 54 may be just a detectable type of RF transmission at a desired frequency and coding, which may not be specific to a particular key fob, but that the RKE system 32 (in FIG. 1) will recognize as requiring it to wake up from its power saving polling mode to a full run mode. The first frame 56 preferably contains a first complete message 62, with the second and third frames 58, 60 just comprising redundant messages (not illustrated) the same as the first complete message 62.

The first complete message 62 preferably contains a synchronizing (sync) portion 64, followed by a message identifier (ID) portion 66, a function code portion 68, and a rolling code bits portion 70. The sync portion 64 merely assures that the RKE system 32 has the correct timing for reading the RF signal 52 properly. The message ID portion 66 and function code portion 68 contain information relating to the particular function being requested, (i.e., the function to be performed based on the button that was pressed on the key fob 38). The rolling code bits portion 70 relates to the encryption being employed. The messages in the second and third frames 58, 60 will just repeat this same information contained in the first frame 56. While the RF signal 52 is shown with three frames 56, 58, 60 each containing the same redundant messages 62, the system can be configured so that a greater or lesser number of redundant frames 56, 58, 60 can be transmitted with each press of a button on the key fob 38, if so desired.

Figure 3A:
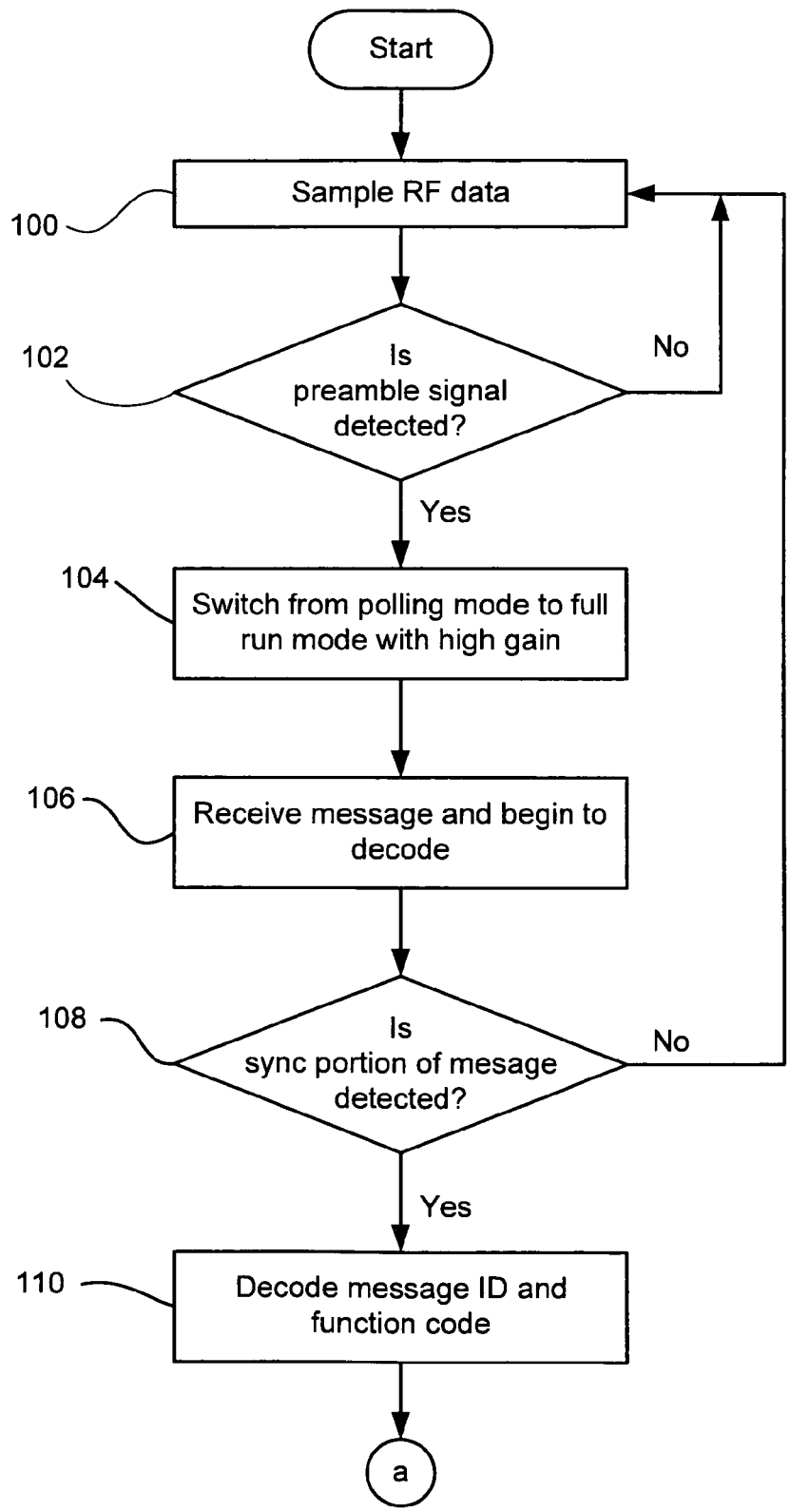
FIG. 3 is a flow chart showing remote keyless entry controller operation in accordance with an embodiment of the present invention.
Figure 3B:
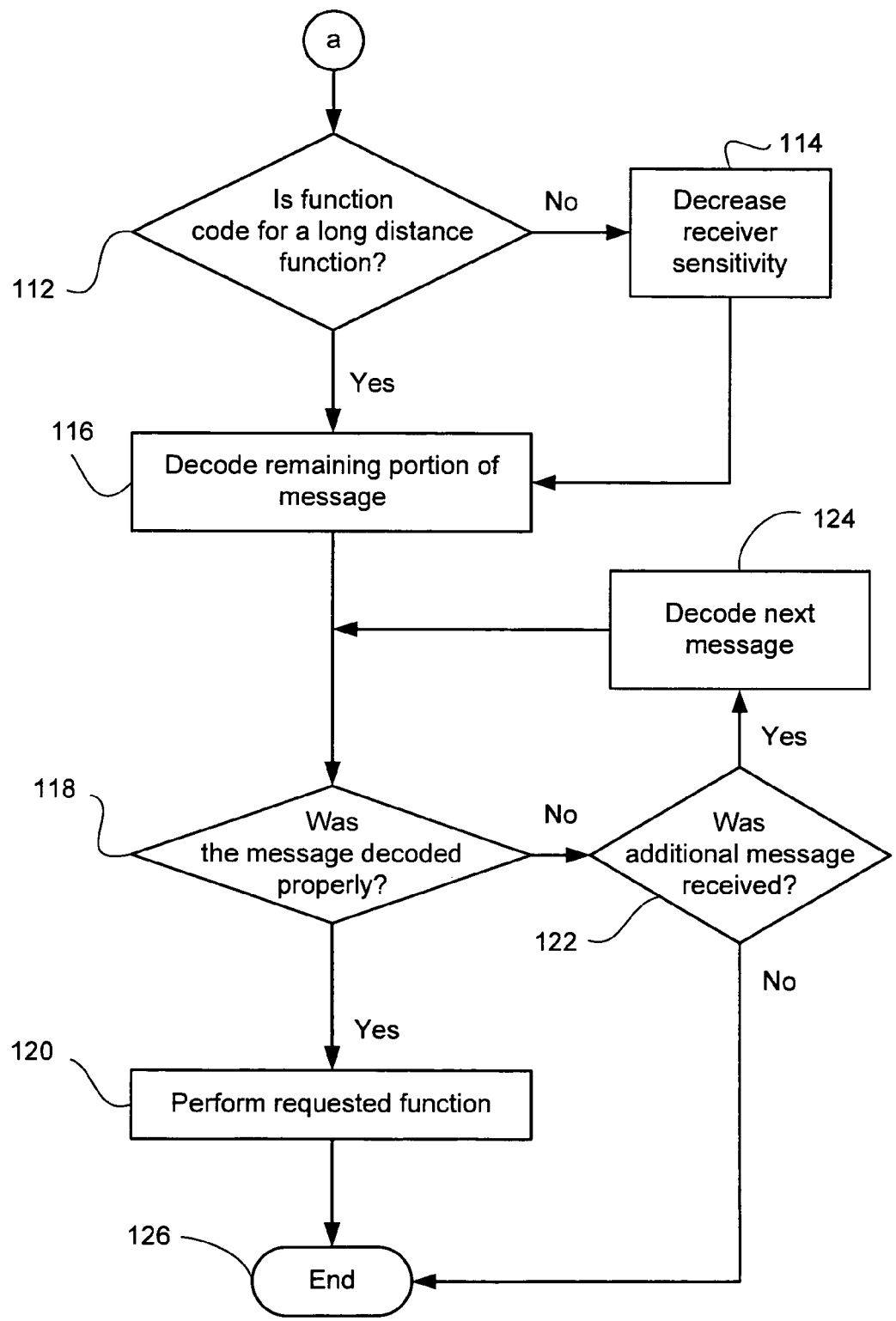

FIG. 3 illustrates a method of operating the controller 34 (of FIG. 1) in the vehicle 30 as it receives a RF signal 52 (such as that illustrated in FIG. 2). The controller 34 typically starts in a polling mode, which reduces power consumption during long periods of inactivity. In the polling mode, it samples RF data, block 100, to determine if a preamble is detected, block 102. If the sampling of the RF data does not detect a preamble, then the sampling of RF data in a polling mode continues. If a preamble is detected, then the controller 34 switches from a polling mode to full run mode with high gain, block 104. The message is then received and begins to be decoded, block 106. If no sync portion of the message is detected, then the controller returns to a polling state and again samples RF data.

If, on the other hand, a sync portion of the message is detected, the message ID and function code are decoded, block 110. If the function code is for a long distance function, the remaining portion of the message is decoded, block 116. If the function code is not for a long distance function, the receiver sensitivity is decreased, block 114, and then the remaining portion of the message is decoded, block 116. Thus, for short distance functions, the message is decoded in a low gain mode. Examples of RKE functions that may be long distance or short distance were discussed above relative to FIG. 1.

The switching from high to low gain mode accounts for the distance from the vehicle 30 that the key fob 38 is when the RKE request is transmitted. Presumably, if the rest of the message becomes corrupted after the receiver 36 is switched to the low gain mode, the user with the key fob 38 must be standing farther away from the vehicle 30 than the range/distance D1, so the short distance function should not be carried out. If, in the low gain mode, the rest of the message is successfully decoded, then the user with the key fob 38 is likely within the range/distance D1 and the function should be carried out. Of course, if the function is a long range function, then the rest of the message is decoded in high gain mode, in which case, it is likely to be decoded properly if the user with the key fob 38 is within the range/distance D2. The levels for high and low gain, and the difference between the two, will depend upon various factors, including the actual distances one wishes for ranges/distances D1 and D2. The setting of levels for high and low gain to achieve the desired results are know to those skilled in the art and so will not be discussed further herein. Moreover, while only two levels of gain are employed to distinguish only short and long distance functions, there may be three levels of gain employed to distinguish short, medium and long distance functions, if so desired.

Consequently, a determination is made as to whether the remaining portion of the message was decoded properly, block 118. If it was not decoded properly, a check is made to determine if an additional message was received, block 122. If an additional message was received, this additional message is decoded, block 124, and a determination is made as to whether this message was decoded properly, block 118. The additional messages may be those contained in the redundant frames 58, 60 (illustrated in FIG. 2). This continues until a message is decoded properly or until no additional messages are received. If a message is decoded properly, then the requested function is performed, block 120, and the routine ends, block 126. If there are no additional messages and no messages were decoded properly, then the routine ends, block 126, without performing any function.

While certain embodiments of the present invention have been described in detail, those familiar with the art to which this invention relates will recognize various alternative designs and embodiments for practicing the invention as defined by the following claims.

What is claimed is:

1. A method of operating a receiver in a remote keyless entry system in a vehicle comprising the steps of:
   (a) providing a receiver having a high gain mode and a low gain mode;
   (b) operating the receiver to receive a wireless signal from a remote keyless entry transmitter;
   (c) decoding a function code portion of the wireless signal for identifying a keyless entry function;
   (d) changing the gain mode of the receiver from a high gain mode to a low gain mode if the function code is not a long distance function, wherein:
      the keyless entry function is a long distance function if the keyless entry function is in a de-activated state when the wireless signal is received, and wherein
      the keyless entry function is not a long distance function if the keyless entry function is in an activated state when the wireless signal is received;
   (e) decoding a remaining portion of the wireless signal;
   (f) determining if the remaining portion of the message was decoded properly; and
   (g) performing a requested function of the function code if the remaining portion of the message was decoded properly.

2. The method of claim 1 further including the steps of:
   (h) determining if an additional wireless signal was received;
   (i) decoding the additional wireless signal if the additional wireless signal was received;
   (j) determining if the additional wireless signal was decoded properly if the additional wireless signal was received; and
   (k) performing the requested function if the additional wireless signal was decoded properly.

3. The method of claim 2 further including the steps of;
   (l) determining if a second additional wireless signal was received;
   (m) decoding the second additional wireless signal if the second additional wireless signal was received;
   (n) determining if the second additional wireless signal was decoded properly if the second additional wireless signal was received; and
   (o) performing the requested function if the second additional wireless signal was decoded properly.

4. The method of claim 1 wherein step (b) is further defined by operating the controller in a polling state.

5. The method of claim 1 wherein step (b) is further defined by operating the receiver to receive a wireless preamble signal.

6. The method of claim 1 wherein step (d) is further defined by the keyless entry function being a vehicle alarm function.

7. The method of claim 1 wherein step (d) is further defined by the keyless entry function being a remote engine start function.

8. The method of claim 1 wherein step (d) is further defined by the keyless entry function being a door lock function.

\* \* \* \* \*